(12) United States Patent
Doyle et al.

(10) Patent No.: US 10,964,447 B1
(45) Date of Patent: Mar. 30, 2021

(54) PERIODIC TRANSMISSION LINE CABLE FILTERING

(71) Applicant: International Business Machines Corporation, Armonk, NY (US)

(72) Inventors: Matthew Doyle, Chatfield, MN (US); Samuel R. Connor, Apex, NC (US); Stuart Brett Benefield, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/918,358

(22) Filed: Jul. 1, 2020

(51) Int. Cl.
*H01B 7/02* (2006.01)
*H01P 1/201* (2006.01)
*H01B 7/18* (2006.01)
*H04L 25/02* (2006.01)

(52) U.S. Cl.
CPC ............. *H01B 7/02* (2013.01); *H01B 7/1805* (2013.01); *H01P 1/201* (2013.01); *H04L 25/0276* (2013.01); *H04L 25/0298* (2013.01)

(58) Field of Classification Search
CPC ......... H01B 7/02; H01B 7/1805; H01P 1/201; H04L 25/0276; H04L 25/0298
USPC ....................................... 174/113 R
See application file for complete search history.

(56) References Cited

U.S. PATENT DOCUMENTS

| | | | |
|---|---|---|---|
| 8,363,679 B2 | 1/2013 | Sorenson et al. | |
| 9,118,097 B2* | 8/2015 | Shiue | H05K 1/025 |
| 9,118,516 B1* | 8/2015 | Ao | H04L 25/0272 |
| 9,386,690 B2* | 7/2016 | Ding | H01P 3/08 |
| 9,479,362 B2* | 10/2016 | Ao | H04L 25/0278 |
| 9,650,477 B2 | 5/2017 | Makal et al. | |

(Continued)

FOREIGN PATENT DOCUMENTS

| | | |
|---|---|---|
| CN | 107403661 A | 11/2017 |
| CN | 208094083 U | 11/2018 |
| CN | 208225612 U | 12/2018 |

OTHER PUBLICATIONS

Xu et al., "Impact of Dynamic Line Rating on Dispatch Decisions and Integration of Variable RES Energy," arXiv:1612.00867v1, Dec. 2, 2016, pp. 1-8.

(Continued)

*Primary Examiner* — Timothy J Thompson
*Assistant Examiner* — Michael F McAllister
(74) *Attorney, Agent, or Firm* — Jay Wahlquist

(57) ABSTRACT

A differential transmission line cable includes a notch filter to manage common-mode energy. The cable includes a narrow portion with two adjacent electrical conductors each having a narrow cross-sectional area and spaced at a narrow spacing. The cable also includes a wide portion longitudinally adjacent to the narrow portion. The wide portion includes the two adjacent electrical conductors each having a wide cross-sectional area greater than the narrow cross-sectional area and spaced at a wide spacing greater than the narrow spacing. The wide and narrow cross-sectional areas and spacings are specified so that the differential-mode impedance of the differential transmission line cable is uniform throughout both the narrow and wide portions and so that differences in the common-mode impedances of the narrow and wide portions create a notch filter to manage common-mode energy in the differential transmission line cable.

20 Claims, 9 Drawing Sheets

(56) References Cited

U.S. PATENT DOCUMENTS

| | | | |
|---|---|---|---|
| 10,485,096 B2* | 11/2019 | Chandra | H05K 1/111 |
| 10,595,396 B2* | 3/2020 | Mutnury | G06F 11/3648 |
| 2011/0030997 A1* | 2/2011 | Hsu | H05K 1/0245 |
| | | | 174/254 |
| 2011/0032048 A1* | 2/2011 | Wu | H01P 1/203 |
| | | | 333/12 |
| 2011/0132648 A1* | 6/2011 | Mutnury | H05K 1/0245 |
| | | | 174/260 |
| 2015/0173256 A1* | 6/2015 | Ao | G06F 30/394 |
| | | | 174/107 |
| 2016/0065391 A1* | 3/2016 | Ao | H04L 25/0276 |
| | | | 375/257 |
| 2018/0197658 A1 | 7/2018 | Daniel et al. | |

OTHER PUBLICATIONS

Guan et al., "Hybrid Spoof Surface Plasmon Polariton and Substrate Integrated Waveguide Transmission Line and Its Application in Filter," IEEE Transaction on Microwave Theory an Techniques, vol. 65, No. 12, Dec. 2017, pp. 4925-4932.

Stevan Jr. et al., "Long Period Bragg Grating in Coaxial Transmission Lines, " Jornal of Microwaves, Optoelectronics and Electromagnetic Applications, vol. 14, No. 1, Jun. 2015, pp. 28-39. http://dx.doi.org/10.1590/2179-10742015v14i1424.

"Wire drawing and extrusion," Mechatronicsly, May 10, 2018, 4 pages. https://mechatronicsly.com/learn/manufacturing/wire-drawing-and-extrusion/.

"Extrusion Die for Coating Wire," Image, Printed: Jan. 13, 2020, 1 page. https://slideplayer.com/slide/6432714/22/images/28/Extrusion+Die+for+Coating+Wire.jpg.

* cited by examiner

900 Filter Notch Depth

950 Notch Filter Schematic

PERIODIC TRANSMISSION LINE CABLE FILTERING

BACKGROUND

The present disclosure generally relates to electronic transmission lines. In particular, this disclosure relates to a transmission line configured to manage common-mode energy in an electronic system.

A transmission line is a specialized cable or other structure designed to conduct alternating current of radio frequency, i.e., currents with a frequency high enough that their wave nature must be taken into account. Transmission lines can be used for purposes such as connecting computer data transmitters and receivers for the purpose of computer network connections and high-speed computer data buses.

An integrated circuit (IC), also known as a "microchip," silicon or computer "chip," is a specially prepared piece of silicon, or other semiconductor material, into which a complex electronic circuit is etched and formed using a photolithographic process. IC types can include computer processors, memory, analog, and customizable devices. ICs can be relatively fragile, and therefore are often mounted on and/or surrounded by a protective, supportive ceramic or plastic package. Electrical connections to the chip can be provided through metal contacts, which can include pins or solder balls located on the exterior of the chip package.

SUMMARY

Embodiments can be directed towards a differential transmission line cable that includes a notch filter configured to manage common-mode energy. The differential transmission line cable can include a narrow portion. The narrow portion can include a first electrical conductor having a first cross-sectional area and a second electrical conductor located adjacent, at a first spacing, to the first electrical conductor. The second electrical conductor can have a cross-sectional area consistent with the first cross-sectional area. The differential transmission line cable can also include a wide portion longitudinally adjacent to the narrow portion. The wide portion can include the first electrical conductor having a second cross-sectional area greater than the first cross-sectional area. The wide portion can also include the second electrical conductor located adjacent, at a second spacing greater than the first spacing, to the first electrical conductor. The second electrical conductor can have a cross-sectional area consistent with the second cross-sectional area. The first cross-sectional area, first spacing, second cross-sectional area and second spacing can be specified so that the differential-mode impedance of the differential transmission line cable is uniform throughout both the narrow portion and the wide portion. The first cross-sectional area, first spacing, second cross-sectional area and second spacing can also be specified so that differences in the common-mode impedances of the narrow portion and of the wide portion are used to create a notch filter to manage common-mode energy in the differential transmission line cable.

Embodiments can also be directed towards a method of manufacturing a differential transmission line cable including a notch filter configured to manage common-mode energy. The method can include forming a wide portion of a first electrical conductor of the differential transmission line cable, the wide portion having a first cross-sectional area. The method can also include forming a narrow portion, longitudinally adjacent to the wide portion, of the first electrical conductor, the narrow portion having a second cross-sectional area less than the first cross-sectional area. The method can also include forming a wide portion of a second electrical conductor of the differential transmission line cable, the wide portion having a cross-sectional area consistent with the first cross-sectional area. The method can also include forming a narrow portion of the second electrical conductor, the narrow portion having a cross-sectional area consistent with the second cross-sectional area.

Embodiments can also be directed towards an electronic system. The electronic system can include a differential transmission line cable including first and second electrical conductors each having a narrow portion and a wide portion. The narrow portions can have a first cross-sectional area and the wide portions can have a second cross-sectional area greater than the first cross-sectional area. The narrow portions can be adjacently located at a first spacing, and the wide portions adjacently located at a second spacing greater than the first spacing. The electronic system can also include a differential driver circuit having output terminals electrically coupled, at a first end of the differential transmission line cable, to the first electrical conductor and to the second electrical conductor. The electronic system can also include a differential receiver circuit having output terminals electrically coupled, at a second end of the differential transmission line cable, to the first electrical conductor and the second electrical conductor.

The above summary is not intended to describe each illustrated embodiment or every implementation of the present disclosure.

BRIEF DESCRIPTION OF THE DRAWINGS

The drawings included in the present application are incorporated into, and form part of the specification. They illustrate embodiments of the present disclosure and, along with the description, serve to explain the principles of the disclosure. The drawings are only illustrative of certain embodiments and do not limit the disclosure.

Figure 1:
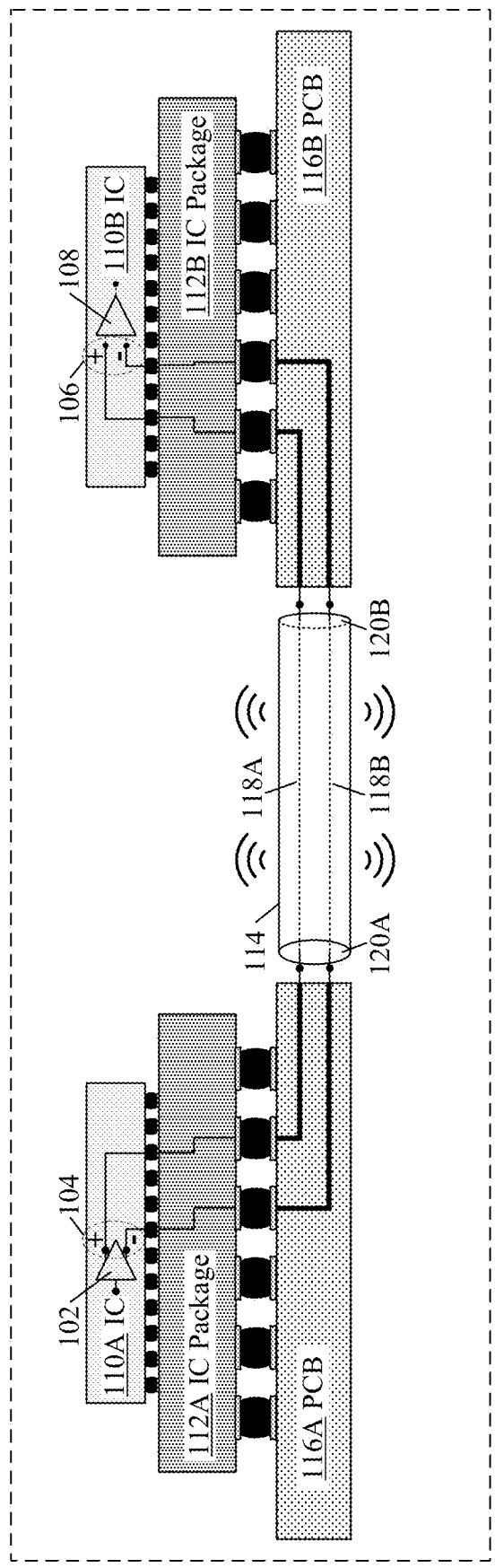
FIG. 1 depicts an electronic system with a differential transmission line cable, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

Certain embodiments of the present disclosure can be appreciated in the context of providing common-mode energy management for differential transmission line cables for electronic equipment such as servers, which may be used to provide data to clients attached to a server through a network. Such servers may include, but are not limited to, web servers, application servers, mail servers, and virtual servers. While not necessarily limited thereto, embodiments discussed in this context can facilitate an understanding of various aspects of the disclosure. Certain embodiments may also be directed towards other equipment and associated applications, such as providing common-mode energy management for differential transmission line cables for electronic equipment such as computing systems, which may be used in a wide variety of computational and data processing applications. Such computing systems may include, but are not limited to, supercomputers, high-performance computing (HPC) systems, and other types of special-purpose computers. Embodiments may also be directed towards providing common-mode energy management for cables within consumer and small office/home office (SOHO) electronic equipment such as personal computers, laptops, mobile and network server devices.

Electromagnetic compatibility (EMC) is understood to be the ability of electrical equipment and/or systems to function acceptably in their electromagnetic environment. This acceptable function can be achieved by the limitation of unintentional generation, propagation and reception of electromagnetic energy by the electrical equipment and/or systems. Such electromagnetic energy can cause unwanted effects such as electromagnetic interference (EMI) or potentially physical damage in operational electronic equipment. The goal of EMC is the correct operation of equipment within a shared electromagnetic environment.

Differential signaling can be used to electronically transmit information using two complementary signals sent over two corresponding paired conductors, also referred to as a "differential pair." Information sent over the paired conductors is represented by voltage differences between the two complimentary signals. An alternating current (AC) common-mode voltage on the differential pair can be caused by a number of electrical characteristics that can be extremely difficult, if not impossible, to completely design out of data transmitter circuits. These characteristics can include, for example, mismatches between skew and rise/fall times of the complimentary signals. An AC common-mode voltage present on the differential pair can generate electromagnetic interference which can then radiate from a cable that includes the paired conductors.

In certain applications, such cables, e.g., a High-Speed Serial Interface (HSSI) cable, can include differential pairs used to transmit signals within an electronic equipment enclosure, e.g., a server cabinet. Applications can also include such cables used to transmit signals externally between electronic equipment enclosures. EMI radiating from cables either internal or external to electronic enclosures can be received by and cause malfunctions in other nearby electronic equipment. It is desirable to manage and/or eliminate EMI radiation from data transmission cables in order to increase both the reliability of nearby electronic devices and systems, and also in order to meet EMC compliance regulations and guidelines.

Certain types of electronic hardware can be used in order to filter out or otherwise mitigate multi-GHz common-mode EMI frequencies radiating from data transmission cables, each having significant drawbacks.

By way of example, a printed circuit board (PCB) based structure referred to as a "transmission line grating" (TLG) can be used to filter common-mode EMI frequencies. Such TLG structures are designed and fabricated into PCBs, and can function by providing one or more notch filters at a desired frequency that matches one or more EMI frequency to be filtered/managed. TLG structures, also known as "electromagnetic bandgap" structures are limited in that they only work within PCB constructs, and are not adaptable to electronic cabling. Electromagnetic bandgap structures can consume large amounts of PCB area, introduce gaps in solid planes, have a narrow frequency band and are sensitive to PCB dielectric constant variation. TLG structure net lengths on a PCB also impose a limit on how many TLG cells can be implemented, which in turn limits the filter depth and/or the number of frequencies that can be filtered.

Spread spectrum IC clocking can also be used to mitigate common-mode EMI radiation issues. Such clocking schemes, however, can be costly, can significantly complicate on-chip clocking devices and clock tree implementation, increase clock jitter, and cause an increase of design complexity for IC high-speed serial (HSS) interfaces. EMI-absorbent materials can be used, however such materials can be costly, applicable in only limited scenarios, and are generally impractical for most electronic cabling solutions. Common-mode chokes can be used, but generally have a very limited frequency range consume excess PCB area, and signals filtered must transition to outer PCB layers. There remains, therefore, a need for a solution that effectively filters common-mode EMI frequencies from electronic cabling.

According to embodiments, a TLG concept implemented within a data transmission cable can be used to filter a broader range of frequencies with greater filter depth than a TLG implementation on a PCB. A cable-based filter implementation can also allow changing a filtering characteristic through changing cables, e.g., special cables may be only used when filtering is needed to pass EMC tests, and no changes are required to PCBs including a TLG implementation.

According to embodiments, a differential transmission line cable having a common-mode notch filter includes adjacently arranged, repeating differential transmission line pair cells. The cells have physical lengths that are each equal to half of an electric wavelength of a center frequency of a common-mode electromagnetic wave to be suppressed during transmission of an electric signal over the differential transmission line. Each cell includes a pair of conductors separated from one another by a narrow spacing for half of the cell length, and by a wide spacing for the other half of the cell length. The diameter of each conductor and the spacing between the conductors of each cell vary over the length of the cell according to a repeating pattern. Diameters and spacings can be chosen so that at every point along the length of each cell a differential mode impedance of the differential transmission line is identical. A common-mode impedance of the differential transmission line changes periodically in accordance with the diameters and spacings of portions of each cell.

The changes in common-mode impedance designed in by wire diameter and spacing dimensions are used to create a notch filter "cell" which can be effective in filtering out a designated frequency of common-mode EMI radiation from the cable. Such a filtering solution can be cost-effective, simple to implement and requires no PCB changes to alter its frequency characteristics.

Various aspects of the present disclosure may be useful for managing and reducing EMI broadcast from cables used to interconnect PCBs within electronic systems. Embodiments can provide cost-effective EMI management without consuming PCB area, or requiring invasive changes to existing electronic systems. Embodiments can include multi-stage implementations of notch filters which can provide deep filter characteristics for efficient and effective EMI filtering. Embodiments can provide broadband EMI filtering.

Embodiments of the present disclosure can yield cost-effective cooling apparatuses for use with electronic systems by using existing and proven cable, insulator, and manufacturing technologies. Aspects of the various embodiments may be used in secure protocol transfer and/or certain cryptographic applications.

Certain embodiments relate to a transmission line configured to manage common-mode energy in an electronic system. FIG. 1 depicts an electronic system 100 with a differential transmission line cable 114, according to embodiments of the present disclosure. FIG. 1 can be particularly useful in depicting and providing an understanding of an electronic system including a differential driver circuit 102 and differential receiver circuit 108 electrically interconnected through a differential transmission line cable 114. Under certain conditions, differential transmission line cable 114 can emit EMI inside or outside of an electronic system. It can be understood that the views included in FIG. 1 are provided for the purpose of illustration only, and may not accurately represent component types, IC package types, physical dimensions, proportions, or other physical features of elements such as ICs, IC packages, PCBs, and differential transmission line cables 114.

Electronic system 100 includes PCB 116A upon which the IC 110A is mounted, with IC package 112A, and a PCB 116B upon which the IC 110B is mounted with IC package 112B. IC 110A includes differential driver circuit 102, and IC 110B that includes differential receiver circuit 108. Differential driver circuit 102 has output terminals 104 that are electrically coupled, at cable end 120A of the differential transmission line cable 114, to the electrical conductors 118A and 118B. Differential receiver circuit 108 has input terminals 106 electrically coupled, at cable end 120B of the differential transmission line cable 114, to the electrical conductors 118A and 118B. The differential transmission line cable 114, PCB 116A, PCB 116B, IC packages 112A and 112B are thereby configured to electrically couple the differential driver circuit 102 to the differential receiver circuit 108.

For ease of illustration, ICs 110A and 110B are depicted, however ICs 110A and 110B can represent other types of electronic components such as an electronic module, discrete, or active device or component. In some applications, differential signals driven on electrical conductors 118A, 118B can result in common-mode AC voltages on these conductors. These common-mode AC voltages can in turn cause EMI radiation from differential transmission line cable 114 within or outside of an electronic system, as discussed above.

Figure 2:
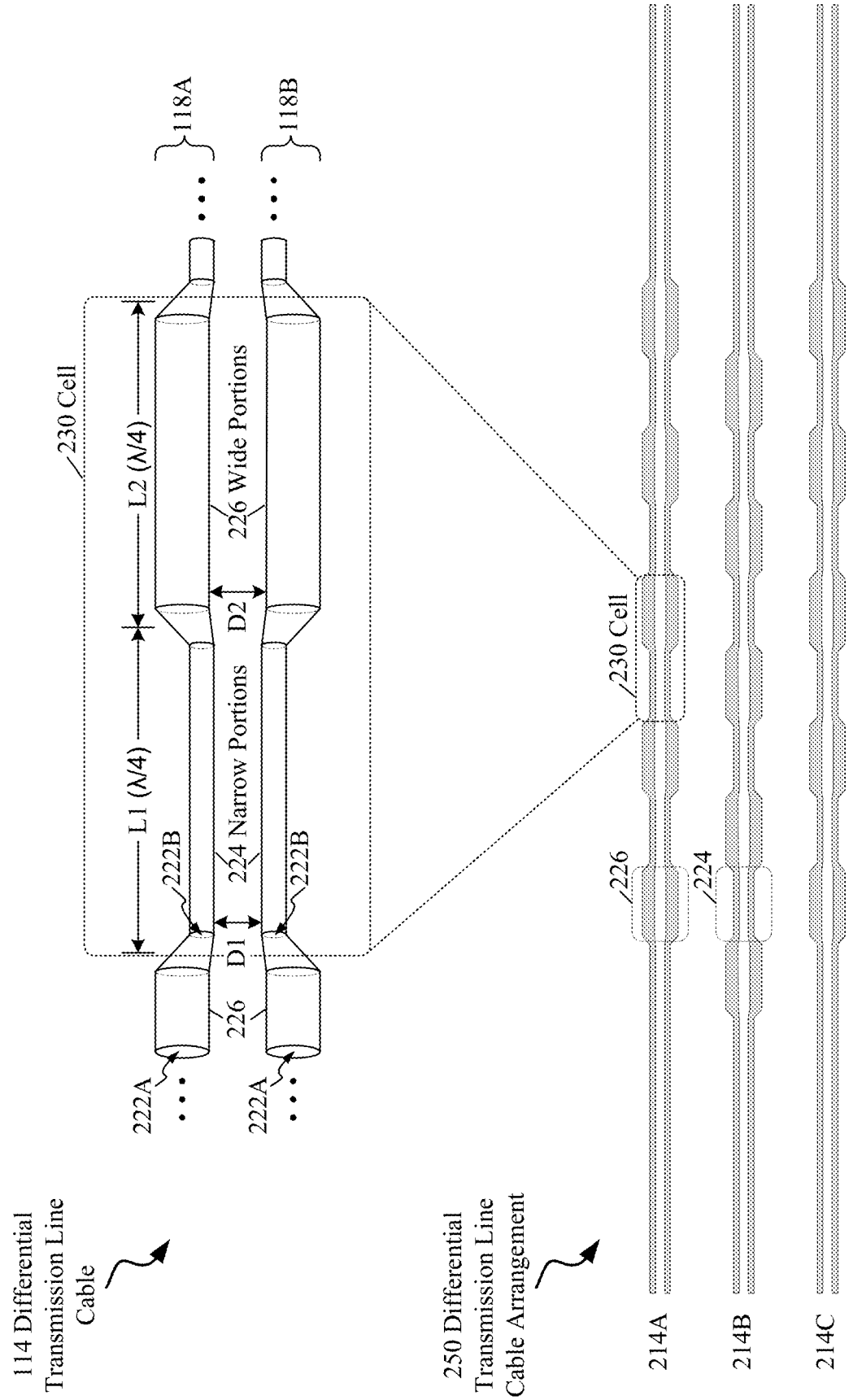
FIG. 2 includes views depicting a differential transmission line cable and a differential transmission line cable arrangement, according to embodiments consistent with the figures.

FIG. 2 includes view 200 depicting a differential transmission line cable and view 250 depicting a differential transmission line cable arrangement, according to embodiments consistent with the figures. View 200 depicts differential transmission line cable 114, consistent with FIG. 1, that includes two electrical conductors 118A and 118B each having a narrow portion 224 and a wide portion 226. View 200 can be particularly useful for depicting electrical conductor 118A, 118B dimensions, spacing, and arrangement, particularly in relation to cell length equal to half of a specified wavelength ($\lambda/2$). Each cell 230 includes a narrow portion 224 longitudinally adjacent to a wide portion 226. Differential transmission line 114 includes a common-mode notch filter cell 230 that is formed from narrow portion 224 and wide portion 226 of electrical conductors 118A and 118B.

In embodiments, length L2 of the wide portion 226 is consistent with a length L1 of the narrow portion 224, and both L1 and L2 are consistent with one quarter of a wavelength ($\lambda/4$) corresponding to a center frequency of a common-mode electromagnetic wave to be suppressed during transmission of a differential signal over the differential transmission line cable 114. For ease of illustration, FIG. 2 shows only one full narrow portion 224 and one full wide portion 226 of each of the electrical conductors 118A and 118B, however in the practice of the present disclosure may include a potentially larger number of longitudinally adjacent alternating portions 224 and 226 of electrical conductors 118A and 118B. Generally, a greater number of cells 230 results in improved suppression of a common-mode signal and its higher harmonics. The notch filter formed by one or more cells 230 can be configured to effectively manage common-mode energy. Notch filter characteristics are further detailed in FIG. 9A and FIG. 9B and the associated description.

Narrow portions 224 of electrical conductors 118A and 118B have a cross-sectional area 222B and wide portions 226 of electrical conductors 118A and 118B have a cross-sectional area 222A that is greater than the cross-sectional area 222B. The narrow portions 224 are located adjacently at a distance D1, and the wide portions 226 are located adjacently at distance D2 that is greater than or equal to the distance D1.

According to embodiments, the cross-sectional areas 222A, 222B and distances D1, D2 of the electrical conductors 118A and 118B in each cell 230 are specified so that the differential-mode impedance of the differential transmission line cable 114 is uniform throughout both the narrow portions 224 and the wide portions 226 of cells 230. In embodiments, differences in the common-mode impedances of the narrow portion 224 and of the wide portion 226 are used to create a notch filter, e.g., 950, FIG. 9B, to manage common-mode energy in the differential transmission line cable 114. Cross-sectional areas 222A, 222B and distances D1, D2 can be determined using electronic design automation (EDA) software such as electromagnetic field solvers or other similar electronic design software. Each cell 230 has a length that is equal to half of an electric wavelength of a center frequency of a common-mode electromagnetic wave to be suppressed during transmission of an electric signal over the differential transmission line.

In embodiments, electrically insulative coating (see 770, FIG. 7) generally surrounds electrical conductors 118A, 118B. However, for ease of illustration, an electrically insulative coating is not depicted in FIG. 2; see FIG. 7 for illustration and details.

View 250 depicts differential transmission line cable 114B located adjacent to additional differential transmission line cables 114A and 114C. Cables 114A, 114B and 114C are consistent with the differential transmission line cable 114 as depicted in FIG. 1 and view 200, FIG. 2. The narrow portion 224 of the differential transmission line cable 214B is located adjacent to a wide portion 226 of the differential transmission line cable 214A. This arrangement may facilitate the interlocking packing of differential pairs within a cable assembly. Such an interlocking arrangement can be useful in increasing the density of differential pairs within a specified volume of a cable assembly without increasing inter-pair crosstalk.

Figure 3:
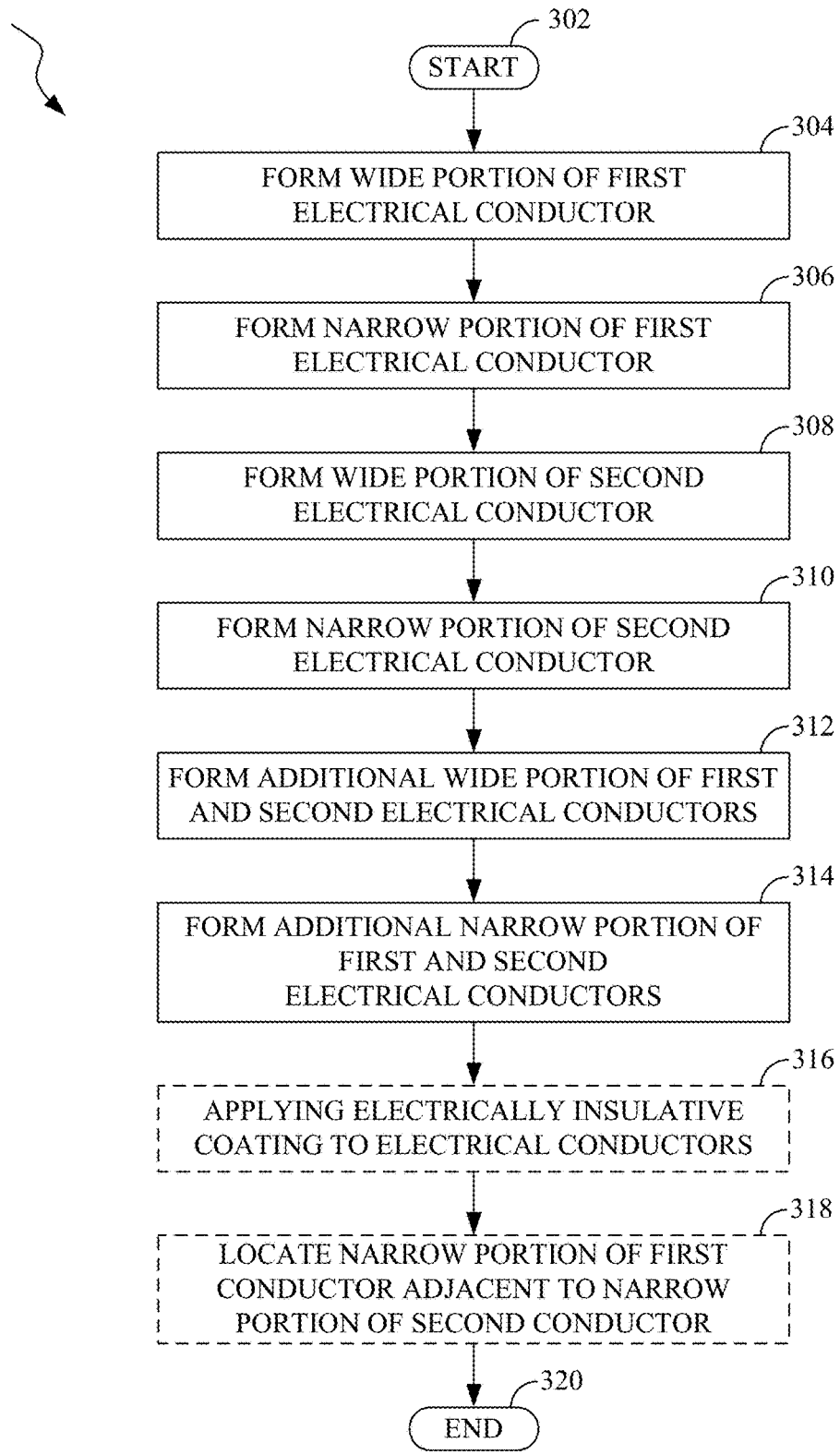
FIG. 3 is a flow diagram depicting a method for manufacturing a differential transmission line cable, according to embodiments consistent with the figures.

FIG. 3 is a flow diagram 300 depicting a method for manufacturing a differential transmission line cable 114 including a notch filter (950, FIG. 9B) configured to manage common-mode energy, according to embodiments consistent with the figures. A differential transmission line cable formed by these process operations can be consistent with differential transmission line cable 114, FIG. 1, and can have common-mode filtering/suppression characteristics that provide for significantly reduced EMI from the cable. In applications, such a transmission line cable can be configured to transmit data signals through differential pairs, as discussed in reference to FIG. 1.

The execution of method 300 can result in a transmission line cable, e.g., differential transmission line cable 114, FIG. 1, having enhanced EMI management and suppression capabilities. An electronic system fabricated according to embodiments can also have reduced EMI. Embodiments of the present disclosure are generally consistent with existing ICs, electronic packages, PCBs, cables and electronic systems, as well as existing design methodologies and electronic system fabrication technologies and methods.

Figure 4:
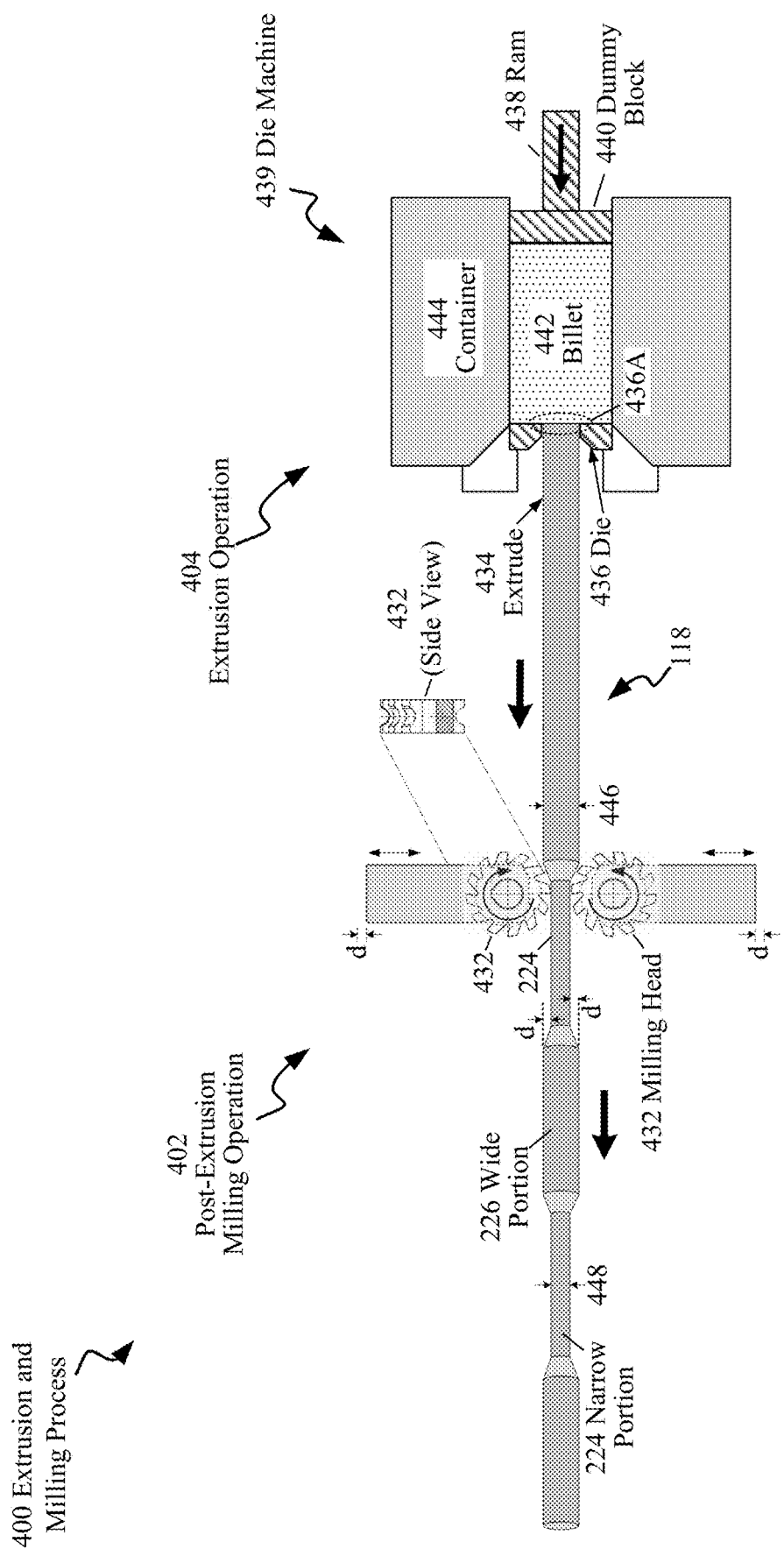
FIG. 4 depicts a wire extrusion and milling process, according to embodiments consistent with the figures.

The progression described in response to in operations 304-318 begins with a billet of conductive material e.g., 442, FIG. 4, and ends with a differential transmission line cable 114, FIG. 2. Process operations can be completed using processes and materials presently used for electronic system fabrication, such as drilling, alignment, placement, insertion, and solder processes, and solder paste 330.

It can be understood that the operations described in response to in FIG. 3 can be performed by processes further depicted in FIGS. 4-7 and described in the associated text. It can be noted that the examples depicted in and described in reference to in FIGS. 4-7 are provided for illustration only, and are not limiting; other process operations not depicted or described may be used within the spirit and scope of the present disclosure. For ease of discussion, it can be understood that figure references in the below discussion of FIG. 3, unless otherwise noted, are generally found within FIG. 2, view 200.

Method 300 moves from start 302 to operation 304. Operation 304 generally refers to forming a wide portion of a first electrical conductor of the differential transmission line cable. According to embodiments, a wide portion 226 of electrical conductor 118A, having a cross-sectional area 222A is formed from a billet of material such as copper, copper alloy, tin, nickel, niobium or titanium (see FIG. 4 for details). This formation may include an extrusion operation 404, as depicted in FIG. 4 and described in the associated text. This extrusion operation 404 can include the use of a die, e.g., 436, FIG. 4, having a die opening 436A that is consistent with diameter 446, FIG. 4 and cross-sectional area 222A, FIG. 2, of electrical conductor 118A. Once wide portion is formed, the method 300 moves to operation 306.

Operation 306 generally refers to forming a narrow portion longitudinally adjacent to the wide portion of the first electrical conductor. According to embodiments, a narrow portion 224 is formed from an existing electrical conductor 118A that has an existing diameter 446, FIG. 4, that corresponds to cross-sectional area 222A. The formation of the narrow portion 224 can be completed by any one of: post-extrusion milling operation 402, FIG. 4, post-extrusion narrowing operation 504B, FIG. 5, or post-extrusion narrowing/stamping operation 625, FIG. 6. The narrow portion 224 that is formed has a cross-sectional area 222B that is less than the cross-sectional area 222A, and that is consistent with diameter 448, FIG. 4. Following operation 306, the narrow portion 224 is longitudinally adjacent to wide portion 226. Once a narrow portion is formed, the method 300 moves to operation 308.

Operation 308 generally refers to forming a wide portion of a second electrical conductor of the differential transmission line cable. According to embodiments, a wide portion 226 of electrical conductor 118B is formed using an operation substantially similar to operation 304, as described above. In some embodiments, operation 308 may be performed simultaneously with operation 304. Once the wide portion is formed, the method 300 moves to operation 310.

Operation 310 generally refers to forming a narrow portion of the second electrical conductor. According to embodiments, a narrow portion 224 is formed from an existing electrical conductor 118B using an operation substantially similar to operation 306, as described above. In some embodiments, operation 310 may be performed simultaneously with operation 306. Following operation 310, the narrow portion 224 is longitudinally adjacent to wide portion 226. Once the narrow portion is formed, the method 300 moves to operation 312.

Operation 312 generally refers to forming additional wide portions of the first and second electrical conductors. According to embodiments, additional wide portions 226 are formed in existing electrical conductors 118A, 118B using an operation substantially similar to operation 304, as described above. In some embodiments, operation 312 may be performed simultaneously on both the first and second electrical conductors 118A, 118B. Following operation 312, the additional wide portions 226 are longitudinally adjacent to narrow portions 224 of electrical conductors 118A, 118B. Once the additional wide portions are formed, the method 300 moves to operation 314.

Operation 314 generally refers forming additional narrow portions 224 of the first and second electrical conductors. According to embodiments, additional narrow portions 224 are formed in existing electrical conductors 118A, 118B using an operation substantially similar to operation 306, as described above. In some embodiments, operation 314 may be performed simultaneously on both the first and second electrical conductors 118A, 118B. Following operation 314, the additional narrow portions 224 are longitudinally adjacent to wide portions 226 of electrical conductors 118A, 118B. Once the additional narrow portion is formed, the method 300 moves to operation 316.

Figure 7:
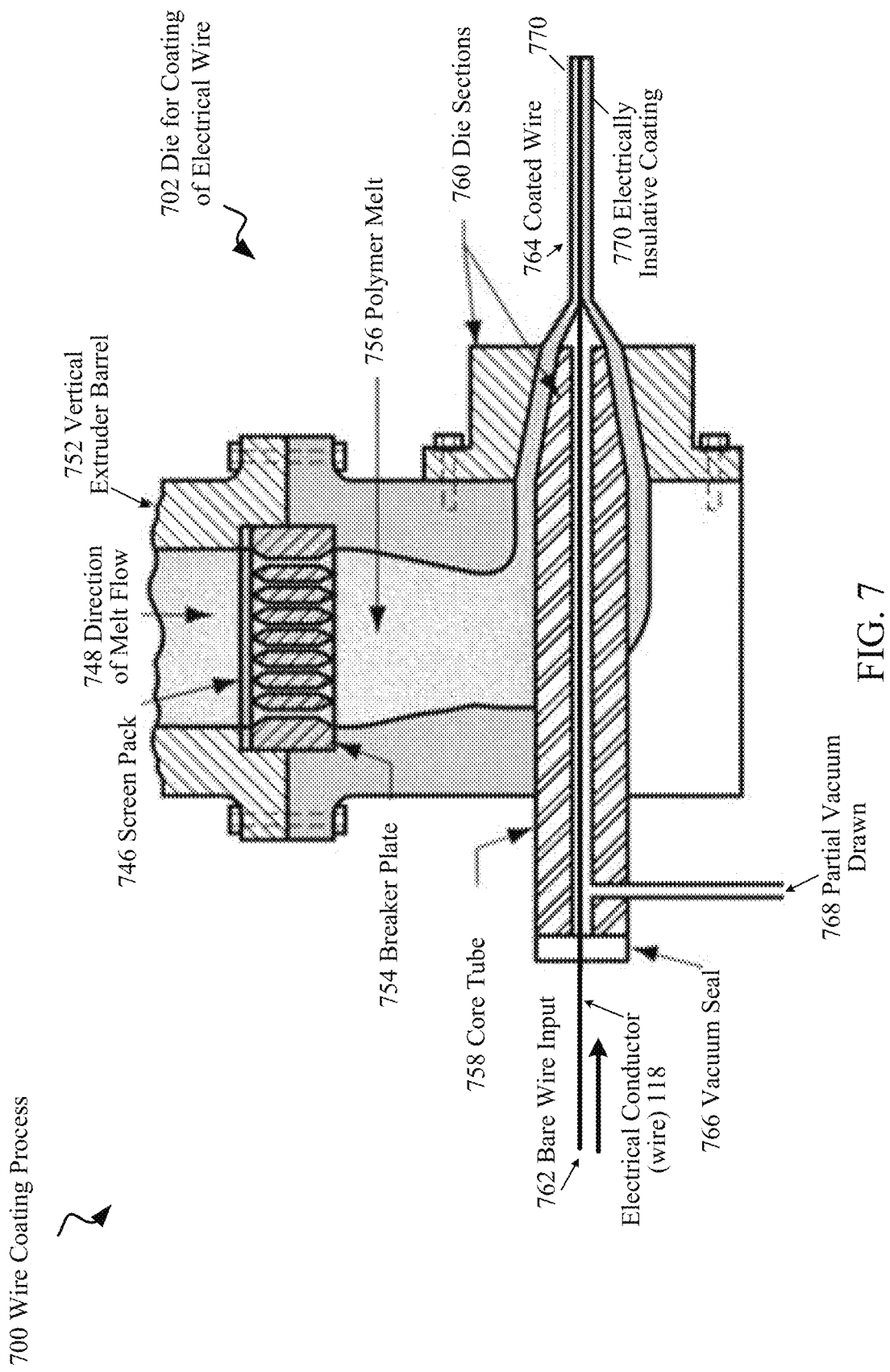
FIG. 7 depicts a wire coating process, according to embodiments consistent with the figures.

Optional operation 316 generally refers to applying an electrically insulative coating to the first and second electrical conductors. According to embodiments, an electrically insulative coating 770, FIG. 7 is applied to existing electrical conductors 118A, 118B using a die for coating of electrical wire 702, as depicted in FIG. 7, and described in the associated text. The electrically insulative coating 770, FIG.

Figure 8:
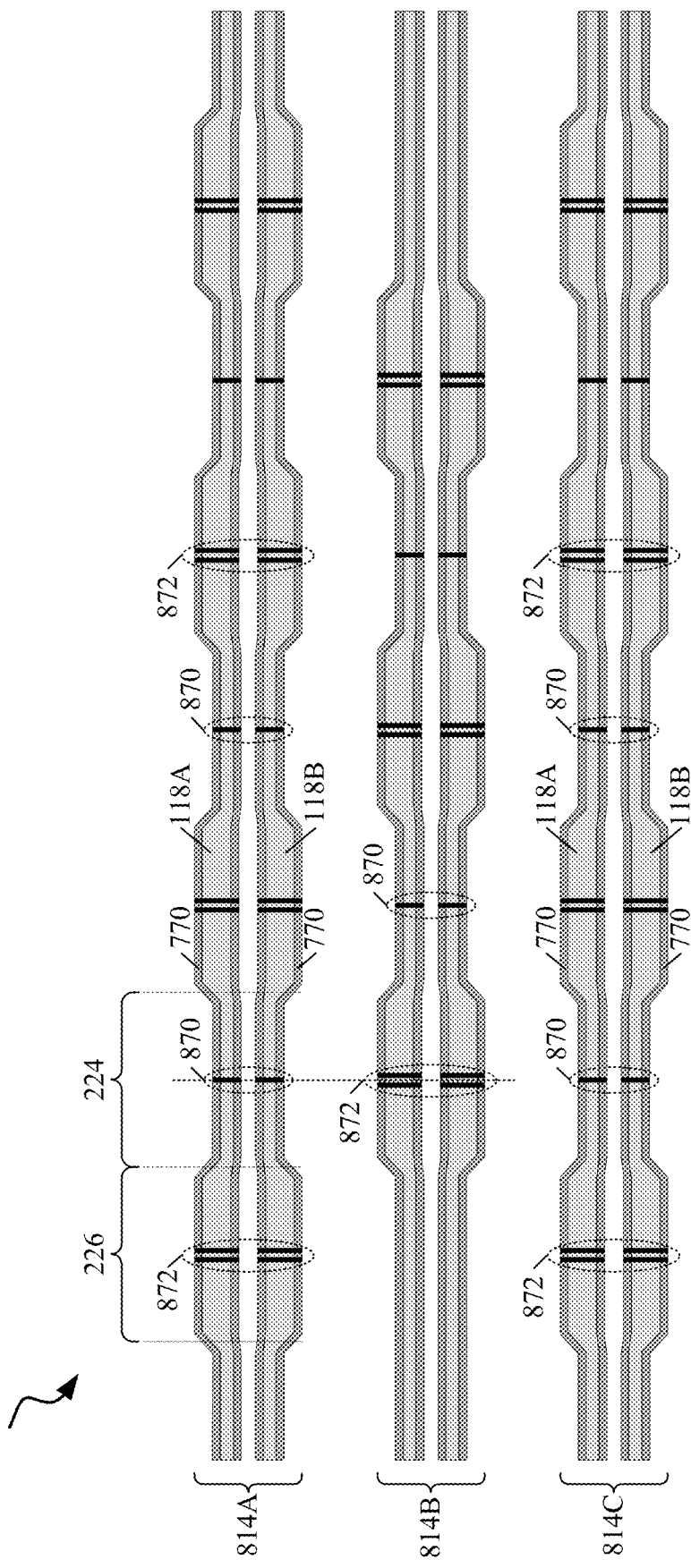
FIG. 8 depicts differential transmission line cable marking, insulation and arrangement, according to embodiments consistent with the figures.

7 can be particularly useful for preventing short-circuits between electrical conductors 118A, 118B, and can be applied using a continuous coating process. In some embodiments, operation 316 can also include a marking operation as depicted in FIG. 8, and described in the associated text. Such a marking operation can result in a marking, e.g., 870, 872, FIG. 8, being applied to narrow portions 224 and wide portions 226 of electrical conductors 118A and 118B, FIG. 2. Once the electrically insulative coating is applied, the method 300 moves to operation 318.

Optional operation 318 generally refers to locating a narrow portion of the first electrical conductor adjacent to a narrow portion of the second electrical conductor. Such conductor location is critical to the establishment of both common-mode and differential impedances, as discussed above, and thus to the proper functioning of differential transmission line cable 114 in the filtering and reduction EMI during data transmission. Markings applied to differential transmission line cable 114 in operation 316 may be used to properly align electrical conductors 118A and 118B. Once the narrow portion of the first electrical conductor is located adjacent to a narrow portion of the second electrical conductor, the method 300 may end at block 320.

FIGS. 4-7 are provided in order to illustrate various process operations that can be used to form electrical conductors from electrical conductive materials and to form electrical insulative coatings onto formed conductors. It can be understood that FIGS. 4-7 are not limiting; other processes and operations may be utilized to form and insulate conductors within the spirit and scope of the present disclosure. It can be understood that the flow of material in FIGS. 4-6, in accordance with arrows provided in the FIGs., is from right to left; the flow of material in FIG. 7 is from left to right.

FIG. 4 depicts a wire extrusion and milling process 400 that includes extrusion operation 404 followed by post-extrusion milling operation 402, according to embodiments consistent with the figures. Extrusion operation 404 is useful in depicting and providing a visual understanding of a process of material transformation of a "bulk" or raw material of billet 442 into an electrical conductor 118, consistent with electrical conductors 118A, 118B, FIG. 2. According to embodiments, billet 442 can include materials such as copper, copper alloy, tin, nickel, niobium or titanium.

During an extrusion operation 404, such materials may be compressed by a leftwards force on ram 438 of die machine 439, wherein the force is further exerted on dummy block 440. This compressive force causes material of billet 442 to be extruded through die opening 436A of die 436, which is attached to container 444. During the extrusion operation 404, billet 442 can be heated and/or molten, in order to expedite the extrusion. The resulting extrude (wire) 434 has a diameter 446, as determined by the die opening 436A of die 436, and travels leftwards, per the illustration of FIG. 4.

Following the extrusion operation 404, and a possible cooling phase, post-extrusion milling operation 402 is used to selectively create one or more narrow portions 224 in electrical conductor 118. As electrical conductor 118 travels leftwards, it is selectively milled by milling heads 432, which includes concave cutting surfaces, as depicted in milling head 432 (Side View). Milling heads 432 are used to selectively remove material from electrical conductor 118 and thus reduce the diameter 446 to a smaller diameter 448. Diameter 446 corresponds to cross-sectional area 222A, FIG. 2, while diameter 448 corresponds to cross-sectional area 222B, FIG. 2.

In order to segment electrical conductor 118 into alternately wide portions 226 and narrow portions 224, milling heads 432 can be moved towards or away from electrical conductor 118 by an automated machine and/or control system, not depicted. It can be understood by those of skill in the art of wire manufacturing that such automated machinery and/or control systems are well understood and commercially viable.

In order to create a narrow portion 224 of electrical conductor 118 having a smaller diameter 448, milling heads 432 can be moved towards electrical conductor 118 by a distance "d" that equals one half of the difference between diameter 446 and diameter 448. As the electrical conductor 118 travels leftwards, and the creation of narrow portion 224 of length L1 is complete, milling heads 432 can be moved away from electrical conductor 118 by the distance d by the automated machine and/or control system. The milling heads 432 can remain moved away from electrical conductor 118 until a length L2 of electrical conductor 118 has moved leftwards, then re-engaged with electrical conductor 118.

The alternating movement of milling heads 432 towards and away from electrical conductor 118 can thus be particularly useful in creating corresponding alternate narrow portions 224 and wide portions 226, respectively. It can be understood that extrusion operation 404 followed by post-extrusion milling operation 402 are processes, which can be run continuously, consistent with conventional wire production speeds and feed rates. As such, the described portions of electrical conductor 118 can be created without the need to remove the electrical conductor 118 from the extrusion or milling machines.

Figure 5:
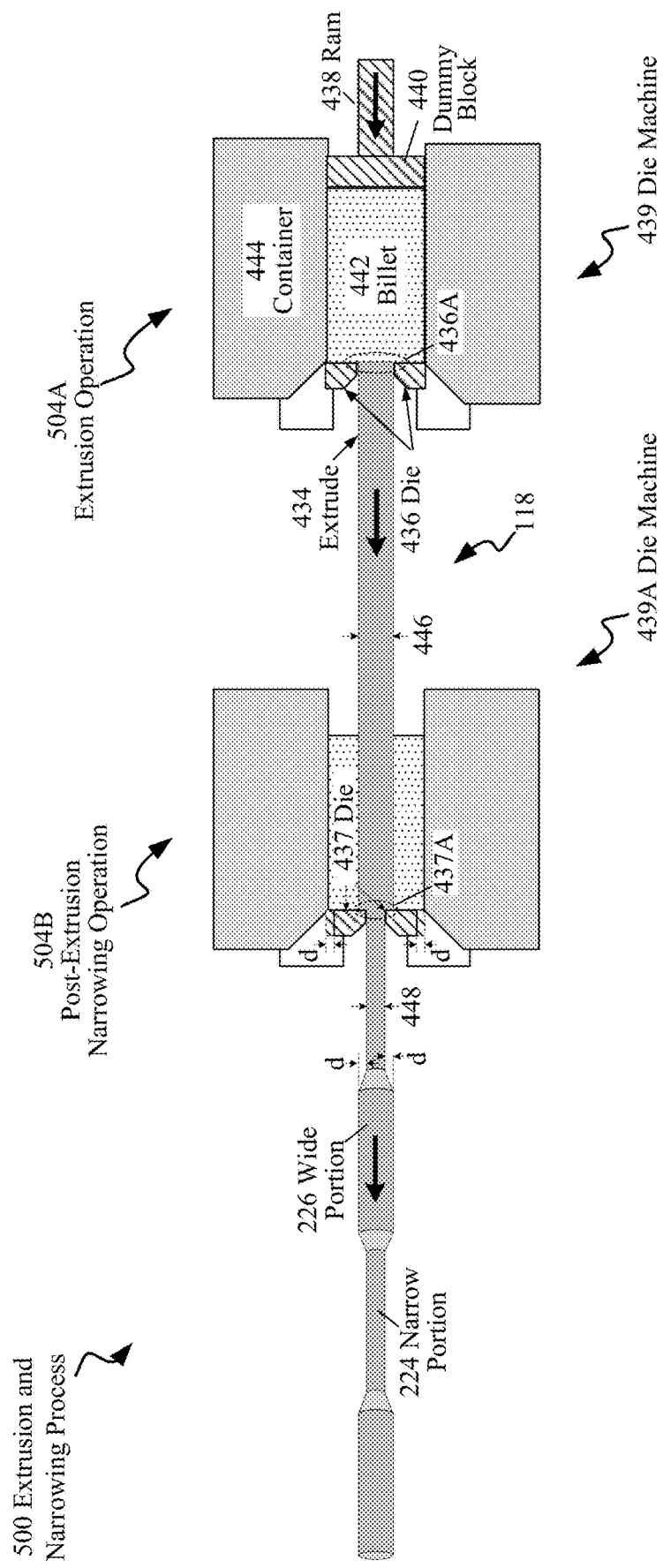
FIG. 5 depicts a wire extrusion and narrowing process, according to embodiments consistent with the figures.

FIG. 5 depicts a wire extrusion and narrowing process 500 that includes extrusion operation 504A followed by post-extrusion narrowing operation 504B, according to embodiments consistent with the figures. Extrusion operation 504A, die machine 539, and the materials of billet 442 are substantially similar to those described in reference to operation 404, FIG. 4.

Following the extrusion operation 504B, and a possible cooling phase, post-extrusion narrowing operation 504B is used to selectively create one or more narrow portions 224 in electrical conductor 118. As electrical conductor 118 travels leftwards, it is selectively narrowed by its passing through die opening 437A of die 437, secured within die machine 539A. According to embodiments, electrical conductor 118 may be drawn or "pulled" through one or both of die machines 539 and 539A. Die 437 is used to selectively narrow electrical conductor 118 and thus reduce the diameter 446 to a smaller diameter 448. Diameter 446 corresponds to cross-sectional area 222A, FIG. 2, while diameter 448 corresponds to cross-sectional area 222B, FIG. 2.

In order to segment electrical conductor 118 into alternately wide portions 226 and narrow portions 224, milling die opening 437A of die 437 can be made larger or smaller by an automated machine and/or control system, not depicted. It can be understood by those of skill in the art of wire manufacturing that such automated machinery and/or control systems are well understood and commercially viable.

In order to create a narrow portion 224 of electrical conductor 118 having a smaller diameter 448, die opening 437A can be made smaller around electrical conductor 118 by a distance of 2*d, where "d" equals one half of the difference between diameter 446 and diameter 448. As the electrical conductor 118 travels leftwards, and the creation of narrow portion 224 of length L1 is complete, die opening 437A can be made larger around electrical conductor 118 by the distance of 2*d by the automated machine and/or control system. The die opening 437A can remain enlarged until a length L2 of electrical conductor 118 has moved leftwards, then again made smaller around electrical conductor 118.

The described alternating enlargement and constriction of die opening 437A around electrical conductor 118 can thus be particularly useful in creating corresponding alternate narrow portions 224 and wide portions 226, respectively. It can be understood that extrusion operation 404 followed by post-extrusion narrowing operation 504B are processes, which can be run continuously, consistent with conventional wire production speeds and feed rates. As such, the described portions of electrical conductor 118 can be created without the need to remove the electrical conductor 118 from the extrusion or wire narrowing/die machines.

Figure 6:
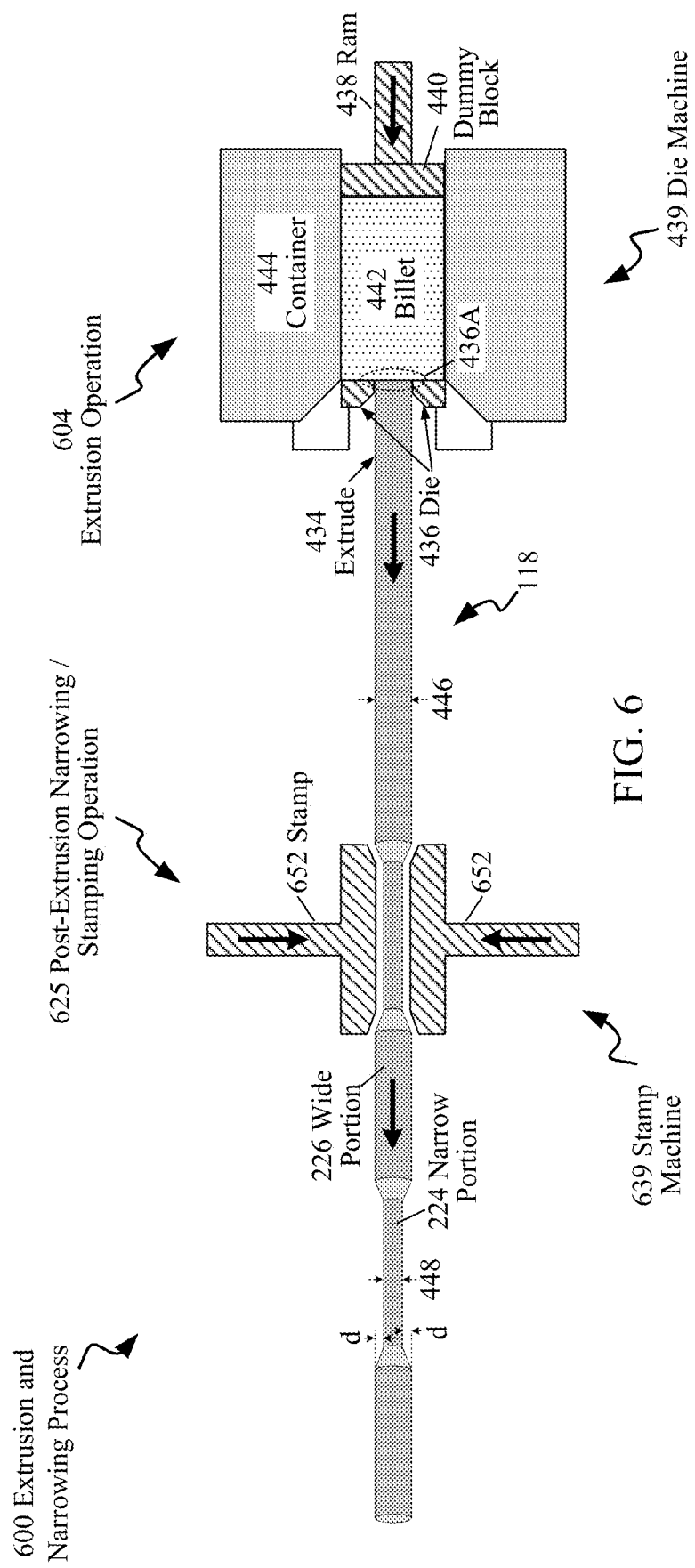
FIG. 6 depicts a wire extrusion and narrowing process, according to embodiments consistent with the figures.

FIG. 6 depicts a wire extrusion and narrowing process 600 that includes extrusion operation 604 and post-extrusion narrowing/stamping operation 625, according to embodiments consistent with the figures. Extrusion operation 604A, die machine 639, and the materials of billet 442 are substantially similar to those described in reference to operation 404, FIG. 4.

Following the extrusion operation 604, and a possible cooling phase, post-extrusion narrowing operation post-extrusion narrowing/stamping operation 625 is used to selectively create one or more narrow portions 224 in electrical conductor 118. As electrical conductor 118 travels leftwards, it is selectively narrowed by its being stamped/compressed by stamps 652 of stamp machine 639. According to embodiments, electrical conductor 118 may be drawn or "pulled" through one or both of die machines 639 and stamp machine 639. Stamp machine 639 is used to selectively narrow electrical conductor 118 and thus reduce the diameter 446 to a smaller diameter 448. Diameter 446 corresponds to cross-sectional area 222A, FIG. 2, while diameter 448 corresponds to cross-sectional area 222B, FIG. 2.

In order to segment electrical conductor 118 into alternately wide portions 226 and narrow portions 224, portions of electrical conductor 118 can be stamped by stamp 652 of stamp machine 639. Stamp machine 639 can include a machine that is automated and/or includes a control system (not depicted). It can be understood by those of skill in the art of wire manufacturing that such automated machinery and/or control systems are well understood and commercially viable.

In order to create a narrow portion 224 of electrical conductor 118 having a smaller diameter 448, an appropriate force may be exerted by stamp 652 of stamp machine 639. Stamp 652 can include "stops" or limits in order to govern the amount of compression of electrical conductor 118 from diameter 446 to smaller diameter 448. As the electrical conductor 118 travels leftwards, it can be stamped by stamp machine 639 at length intervals equal to L2 in order to create a continuously alternating sequence of narrow portions 224 and wide portions 226. A control system of stamp machine 639 can thus be particularly useful to sense a length of electrical conductor 118 that has passed beneath the stamp 652 and, in response, alternately stamp and release electrical conductor 118.

It can be understood that extrusion operation 604 followed by post-extrusion narrowing/stamping operation 625 are processes, which can be run continuously, consistent with conventional wire production speeds and feed rates. As such, the described portions of electrical conductor 118 can be created without the need to remove the electrical conductor 118 from the extrusion or narrowing/stamping and die machines. According to embodiments, stamp 652 features can be changed to accommodate a multitude of desired electrical conductor 118 features.

FIG. 7 depicts a wire coating process 700, according to embodiments consistent with the figures. FIG. 7 depicts a die for coating of electrical wire 702, which can be useful for providing a visual understanding of a machine and associated process for coating a bare wire/electrical conductor with an electrical insulative coating. Such a machine and process can be particularly useful for coating wires such as electrical conductor 118/118A/118B, and is consistent with operation 316, FIG. 3.

Die for coating of electrical wire 702 includes a vertical extruder barrel 752 through which a molten insulative material such as polymer melt 756 flows downward in a direction indicated by direction of melt flow 748. Polymer melt 756 flows through screen pack 746 and breaker plate 754, which can be useful in improving mixing and filtering of the polymer melt 756.

A bare wire, consistent with electrical conductor 118, is received at bare wire input 762, and moves from left to right as depicted in FIG. 7. Vacuum seal 766 is useful in maintaining a proper vacuum between the electrical conductor/wire 118 and core tube 758 which the wire passes through. A slight partial vacuum drawn 768 is drawn between wire 118 and polymer in core tube 758 to promote adhesion of the polymer coating to the wire 118.

As the wire 118 moves to the right, it emerges from the core tube 758 and die sections 760 as a coated wire 764 having an added electrically insulative coating 770. Electrically insulative coating 770 can be particularly useful for protecting the electrical conductor 118, and preventing unwanted electrical contact between adjacent electrical conductors, for example, when assembled into a differential pair.

According to embodiments, the above-described coating process can be implemented after a final stage of electrical conductor 118. The process can be applied as the wire is pulled through the die at a high-speed, e.g., up to 50 m/s (10,000 ft/min), consistent with similar existing wire coating processes. The electrical conductor 118 can provides rigidity during a post-coating cooling process, which can be aided by passing coated wire through a water cooling tough. Following a cooling process, the finished insulated wire can be wound onto spools.

FIG. 8 depicts differential transmission line cable marking, insulation and arrangement including three differential transmission line cables 814A, 814B and 814C, according to embodiments consistent with the figures. FIG. 8 depicts the marking, insulating, and arrangement of differential transmission line cables 814A, 814B, 814C, consistent with operations 316 and 318, FIG. 3, and FIG. 7.

Following a wire coating process, e.g., 700, and subsequent cooling, electrical conductors 118A, 118B have an electrically insulative coating 770 on their outer surfaces. Markings, e.g., marking 872 and marking 870 can be applied to electrically insulative coating 770 in order to mark various sections of electrical conductor 118A, 118B, for example, the center of wide portion 226 and narrow portion 224, respectively. These markings may subsequently be used for the alignment of differential transmission line cables, e.g., 814A, 814B and 814C.

Alignment of differential transmission line cables, e.g., 814A, 814B and 814C, can be useful for efficient packaging within a cable assembly, and/or for reasons of optimizing or tuning electrical performance of the differential transmission line cables.

Various methods of marking the electrical conductors 118A, 118B can include stamping the conductors with a die, (see, for example, FIG. 6, and/or marking the conductors with various types of ink or paint. Methods of marking the electrical conductors can also include applying thermochromatic liquid crystals, used within microcapsules to allow color identification of features associated with altered conductor shape. X-ray techniques can also be used for subsequent differential pair alignment.

Figure 9A:
FIG. 9A includes a graph depicting common-mode insertion loss as a function of frequency and FIG. 9B includes a schematic depiction of a differential transmission line cable acting as a notch filter, according to embodiments consistent with the figures.
Figure 9A:
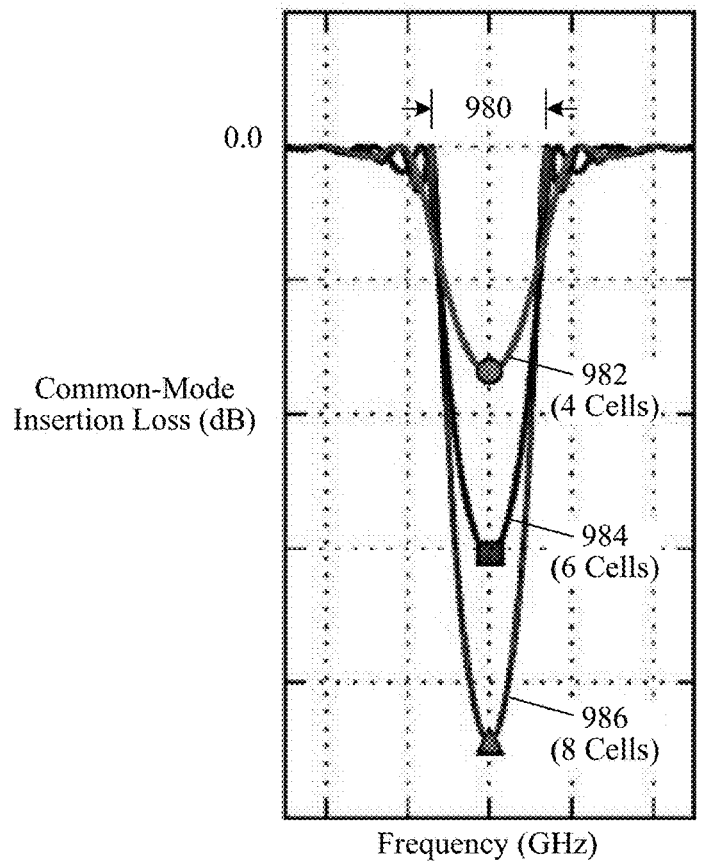
Figure 9B:
Figure 9B:
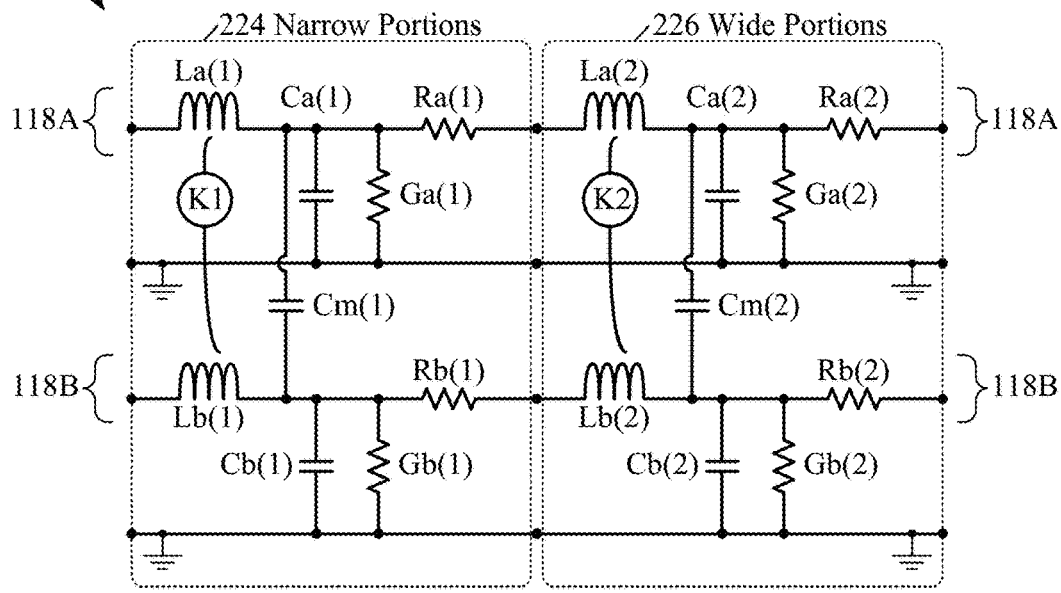

FIG. 9A includes a graph 900 depicting common-mode insertion loss as a function of frequency and FIG. 9B includes a schematic depiction 950 of a differential transmission line cable acting as a notch filter, according to embodiments consistent with the figures. Graph 900 can be particularly useful for depicting and creating a visual understanding of the effects of including various numbers of cells (see 230, FIG. 2.) upon the depth of the filter notch characteristic.

The y-axis of graph 900 corresponds to a common-mode insertion loss, generated by electrical circuit simulations, of a transmission notch filer, in accordance with embodiments of the present disclosure, consistent with the FIGs. The x-axis of graph 900 corresponds to an operating frequency (GHz) of the notch filter. Curve 982 represents the common-mode insertion loss of a filter that includes 4 cells in a series arrangement, consistent with differential transmission line cable 114 construction. Similarly, curves 984 and 986 represent the common-mode insertion loss characteristics of filters including 6 cells and 8 cells, respectively.

It can be noted, that graph 900 clearly indicates that an increase in the number of cells in the notch filter creates a more effective and efficient filter characteristic of the differential transmission line cable acting as a notch filter, according to embodiments. A larger number of cells in the cable can provide more effective common-mode signal suppression functionality to the cable. An electronic system designer can, accordingly, tailor the number of specified cells 230, FIG. 2, to include in the differential transmission line cable, in order to create a desired filter characteristic that effectively mitigates common-mode EMI within the cable. Various cables can therefore be manufactured to have varying amounts of EMI suppression capability, e.g., (5, 10, 15, 20 dB, etc).

Notch filter schematic 950 is useful in depicting an electrical circuit representation of a narrow portion 224 and a wide portion 226 of a differential transmission line cable 114. The narrow portion 224 and wide portion 226 each include electrical conductor 118A and electrical conductor 118B, a corresponding ground line, and various electrical elements representing the characteristics of the conductors. Electrical elements depicted include line resistances Ra (1), Ra (2), Rb (1) and Rb (2), conductances Ga (1), Ga (2), Gb (1) and Gb (2), capacitances Ca (1), Ca (2), Cb (1) and Cb (2), line inductances La (1), La (2), Lb (1) and Lb (2), mutual capacitances Cm (1) and Cm (2), and mutual inductances K1 and K2.

An electrical circuit designer can, with the aid of electrical circuit modeling and simulation tools, simulate the effects of various wire geometries that can result in the modification of these parameters, which in turn can be use to tune common-mode and differential impedance values. The specification, modification, and simulation of these impedance values can provide valuable insight when designing wire section, i.e., narrow and wide section, geometries and spacings for embodiments of the present disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A differential transmission line cable including a notch filter configured to manage common-mode energy, the differential transmission line cable comprising:
   a narrow portion including:
      a first electrical conductor having a first cross-sectional area; and
      a second electrical conductor located adjacent, at a first spacing, to the first electrical conductor, the second electrical conductor having a cross-sectional area consistent with the first cross-sectional area; and
   a wide portion longitudinally adjacent to the narrow portion, the wide portion including:
      the first electrical conductor having a second cross-sectional area greater than the first cross-sectional area; and
      the second electrical conductor located adjacent, at a second spacing greater than the first spacing, to the first electrical conductor, the second electrical conductor having a cross-sectional area consistent with the second cross-sectional area;
   wherein the first cross-sectional area, first spacing, second cross-sectional area and second spacing are specified so that:
      the differential-mode impedance of the differential transmission line cable is uniform throughout both the narrow portion and the wide portion; and
      differences in the common-mode impedances of the narrow portion and of the wide portion are used to create a notch filter to manage common-mode energy in the differential transmission line cable.

2. The differential transmission line cable of claim 1, further comprising:
   an additional narrow portion, consistent with the narrow portion, that is longitudinally adjacent to the wide portion; and
   an additional wide portion, consistent with the wide portion, that is longitudinally adjacent to the additional narrow portion.

3. The differential transmission line cable of claim 1, wherein a length of the wide portion is consistent with a length of the narrow portion.

4. The differential transmission line cable of claim 1, wherein the first electrical conductor is separated from the second electrical conductor by an electrically insulative coating.

5. The differential transmission line cable of claim 1, wherein a length of the wide portion and a length of the narrow portion are each consistent with one quarter of a wavelength corresponding to a center frequency of a common-mode electromagnetic wave to be suppressed during transmission of a differential signal over the differential transmission line cable.

6. The differential transmission line cable of claim 1, wherein the differential transmission line cable is located adjacent to an additional differential transmission line cable consistent with the differential transmission line cable.

7. The differential transmission line cable of claim 6, wherein the narrow portion of the differential transmission line cable is located adjacent to a wide portion of the additional differential transmission line cable.

8. A method of manufacturing a differential transmission line cable including a notch filter configured to manage common-mode energy, the method comprising:
- forming a wide portion of a first electrical conductor of the differential transmission line cable, the wide portion having a first cross-sectional area;
- forming a narrow portion, longitudinally adjacent to the wide portion, of the first electrical conductor, the narrow portion having a second cross-sectional area less than the first cross-sectional area;
- forming a wide portion of a second electrical conductor of the differential transmission line cable, the wide portion having a cross-sectional area consistent with the first cross-sectional area;
- forming a narrow portion of the second electrical conductor, the narrow portion having a cross-sectional area consistent with the second cross-sectional area.

9. The method of claim 8, further comprising
- forming an additional narrow portion longitudinally adjacent to the wide portion; and
- forming an additional wide portion longitudinally adjacent to the additional narrow portion.

10. The method of claim 8, further comprising applying an electrically insulative coating to each of the first electrical conductor and the second electrical conductor.

11. The method of claim 8, further comprising locating the narrow portion of the first electrical conductor adjacent to the narrow portion of the second electrical conductor.

12. The method of claim 8, further comprising locating the differential transmission line cable adjacent to an additional differential transmission line cable consistent with the differential transmission line cable.

13. The method of claim 12, further comprising locating the narrow portion of the differential transmission line cable adjacent to a wide portion of the additional differential transmission line cable.

14. The method of claim 8, wherein forming a narrow portion of the first and second electrical conductors includes removing, with a milling operation, material from the wide portion of the first and second electrical conductors.

15. The method of claim 8, wherein forming a wide portion of the first and second electrical conductors includes passing the first and second electrical conductors through a die machine having a die opening consistent with the first cross-sectional area.

16. The method of claim 8, wherein forming a narrow portion of the first and second electrical conductors includes passing the first and second electrical conductors through a die machine having a die opening consistent with the second cross-sectional area.

17. The method of claim 8, wherein forming a narrow portion of the first and second electrical conductors includes a stamping operation configured to cause the cross-sectional area of the narrow portion of the first and of the second electrical conductors to be consistent with the second cross-sectional area.

18. The method of claim 8, further comprising applying, to each of the first electrical conductor and the second electrical conductor, a marking indicating locations of the respective narrow and wide portions of the first and second electrical conductors.

19. An electronic system comprising:
- a differential transmission line cable including first and second electrical conductors each having a narrow portion and a wide portion, the narrow portions having a first cross-sectional area and the wide portions having a second cross-sectional area greater than the first cross-sectional area, the narrow portions adjacently located at a first spacing, and the wide portions adjacently located at a second spacing greater than the first spacing;
- a differential driver circuit having output terminals electrically coupled, at a first end of the differential transmission line cable, to the first electrical conductor and to the second electrical conductor; and
- a differential receiver circuit having output terminals electrically coupled, at a second end of the differential transmission line cable, to the first electrical conductor and the second electrical conductor.

20. The electronic system of claim 19 further comprising:
- a first integrated circuit (IC) that includes the differential driver circuit;
- a second IC that includes the differential receiver circuit;
- a first printed circuit board (PCB) upon which the first IC is mounted; and
- a second PCB upon which the second IC is mounted;
- wherein the differential transmission line cable, the first PCB and the second PCB are configured to electrically couple the differential driver circuit to the differential receiver circuit.

\* \* \* \* \*